US008838712B2

(12) United States Patent
Nieuwerth

(10) Patent No.: US 8,838,712 B2
(45) Date of Patent: Sep. 16, 2014

(54) PROCESSING OF ASSOCIATED MESSAGES FROM PLURAL SOCIAL NETWORK SERVICES

(75) Inventor: Marielke Nieuwerth, Gasselternijveen (NL)

(73) Assignee: Vodafone Holding GmbH, Dusseldorf (DE)

( * ) Notice: Subject to any disclaimer, the term of this patent is extended or adjusted under 35 U.S.C. 154(b) by 152 days.

(21) Appl. No.: 13/298,572

(22) Filed: Nov. 17, 2011

(65) Prior Publication Data

US 2012/0143973 A1    Jun. 7, 2012

(30) Foreign Application Priority Data

Dec. 3, 2010  (EP) .................................... 10193684

(51) Int. Cl.
*G06F 15/16*      (2006.01)
*G06Q 10/10*      (2012.01)
(52) U.S. Cl.
CPC ................................. *G06Q 10/107* (2013.01)
USPC ....................................................... 709/206

(58) Field of Classification Search
USPC ....................................................... 709/206
See application file for complete search history.

(56) References Cited

U.S. PATENT DOCUMENTS

| 2007/0105554 A1* | 5/2007 | Clark et al. ................ 455/435.1 |
| 2009/0138562 A1* | 5/2009 | Schmulen et al. ............ 709/206 |
| 2011/0302250 A1* | 12/2011 | Plotts et al. .................... 709/206 |
| 2012/0143972 A1* | 6/2012 | Malik et al. .................... 709/206 |

* cited by examiner

*Primary Examiner* — Shaq Taha
(74) *Attorney, Agent, or Firm* — International IP Law Group, PLLC

(57) ABSTRACT

The subject innovation relates to a method for presenting messages to a user of social network services. The messages are provided via an aggregation system, the aggregation system being connected to the social network services. An exemplary method comprises storing an identifier associated with a message in a user account of the user in the aggregation system. The exemplary method also comprises receiving messages from the social network services in the aggregation system, the messages being associated with the identifier. The exemplary method further comprises presenting the received messages to the user in response to a comparison between the identifier associated to the received messages and the identifiers stored in the user account.

9 Claims, 3 Drawing Sheets

PROCESSING OF ASSOCIATED MESSAGES FROM PLURAL SOCIAL NETWORK SERVICES

CROSS-REFERENCE TO RELATED APPLICATION

This application claims priority to European (EP) Patent Application No. 10 193 684.7-1238, filed on Dec. 3, 2010, the contents of which are incorporated by reference as if set forth in their entirety herein.

BACKGROUND

Social network services, such as, for example, Facebook, Twitter and LinkedIn, allow for social interactions between their users. Typically, a social network service comprises a representation of each user, which is often configured as a profile including personal details of the user, and it includes the social links between the users. The social links often comprise "friendship" relations or the like, which are established after a confirmation of the users linked to each other.

In addition, social network services provide means for their users to engage in interactions with other users. For this purpose, the social network services usually include one or more services allowing users to exchange content of various types. For instance, there may be a messaging service allowing the users to send messages to other users, and users may post message which may be retrieved by other users.

Due to the increasing number of social network services and the growing interest therein, more and more users subscribe to multiple social network services. In order to simplify the utilization of multiple social network services for a user, so-called social network aggregation services are provided. Such services allow pulling together information from multiple social network services into a single location. This may include consolidating user profiles in different social network services into one profile which the user can access through the social network aggregation services.

Moreover, social network aggregation services usually allow for a consolidated receipt and provision of messages through multiple social network services the user has subscribed to. For this purpose the social network aggregation service may collect messages the user receives in the different social network services and may present the messages to the user in a single graphical user environment. A social network aggregation service may also allow a user to generate messages and may forward the user messages automatically to the various social network services the user has subscribed to.

The transmission of messages via multiple social network services leads to a multiplication of the messages which gives rise to various detrimental effects:

One such effect may occur, if the recipient of a message is registered for multiple social network services via which the message is posted or sent. In this case, the recipient may receive the message through each social network service and the social network aggregation service utilized by the recipient may present the same message once for each social network service through which it receives.

A further problem relates to conversations which may develop from one message provided to multiple recipients via different social network services. Replies to the message may be sent from each social network service. Here, the sender's social network aggregation service may have to treat the different conversations independently from each other. In particular, the social network aggregation service may not be able to allocate replies from different social network services to one originating message. For this reason, the social network aggregation service may have to repeat the originating message for each social network service to which the message was sent to be able to present the conversations.

Thus, particularly in the aforementioned situations, social network aggregation services of senders and receivers of messages present one message multiple times. This is inconvenient and annoying for the users of social network aggregation services and affects the attractiveness of such services.

SUMMARY

The subject innovation relates to a processing of associated messages from plural social network services. In particular, the subject innovation is related to a method for providing messages to a user of social network services and to a system for executing the method.

Therefore, the subject innovation may provide a social network aggregation system and a method for operating the same, which avoids multiple presentations of one message.

According to a first aspect of the subject innovation, a method for presenting messages to a user of social network services is provided. The messages are provided via an aggregation system, which is connected to the social network services. The method comprises:

storing an identifier associated with a message in a user account of the user in the aggregation system, receiving messages from the social network services in the aggregation system, the messages being associated with the identifier, and presenting the received messages to the user in response to a comparison between the identifier associated to the received messages and the identifiers stored in the user account.

According to a second aspect of the subject innovation, an aggregation system for providing messages to a user of social network services is suggested. The aggregation system is connected to the social network services and comprises a storing component adapted to store an identifier associated with at least one message in a user account of the user in the aggregation system, a receiving component adapted to receive messages from the social network services in the aggregation system, the messages being associated with an identifier, and a presentation component adapted to present the received messages to the user in response to a comparison between the identifier associated to the received messages and the identifiers stored in the user account.

The subject innovation suggests associating an identifier to messages, which particularly allows for allocating messages received from different social network services to each other and/or to further messages originating from the aggregation system. Hereby, the aggregation system is enabled to avoid multiple presentations of one message received from multiple social network services and to allocate replies to one message received from multiple social network services to the originating message.

In one embodiment of the method and the system, the identifier associated to a first message is stored in response to a receipt of the first message in the aggregation system, and the first message is presented to the user. Another embodiment of the method and the system provides that a second received message is not presented to the user, if the second message is associated to the stored identifier associated to the first message. However, the user may be notified of the receipt of the second message, the notification particularly specifying the social network service from which the second message was received.

In embodiments, the identifier may be associated to the message by an aggregation system which is used by the originator of the message for generating the message and providing the message to the social network services from which the first and the second messages are received. Preferably, the aggregation system used by the originator is the same or another aggregation system as the one receiving the first and second messages.

In an embodiment of the method and the system, an originating message is associated with an identifier in the aggregation system and provided from the aggregation system to the social network services, the identifier being stored in the aggregation system in connection with passing the originating message from the aggregation system to the social network services.

In another embodiment of the method and the system, a reply transmitted from a social network service to the aggregation system as a response to the originating message is associated to the identifier of the originating message. In particular, the social network service used for generating the reply may associate to the reply the identifier assigned to the originating message.

Moreover, in one embodiment of the method and the system, the reply is presented to the user in association to the originating message, when it is determined in the aggregation system that the identifier associated to the reply corresponds to the identifier associated to the originating message stored in the aggregation system. In particular, a plurality of replies associated with an identifier corresponding to the identifier associated to the originating message may be presented to the user as a group of messages.

Preferably, the social network service, from which a reply is received in the aggregation system, is specified in the presentation of the reply.

In another embodiment of the method and the system, the identifier associated to a message by the aggregation system may be replaced by another identifier, when passing the message to a social network service, and an allocation between the identifiers may be stored in a mapping table. When the message or a reply thereto is received from the social network service in association with the other identifier, the other identifier is replaced by the original identifier, i.e. the identifier assigned by the aggregation server, using the mapping table. Hereby, the social network services are enabled to use identifiers different from the identifier associated with a message by the aggregation server.

According to the subject innovation, a computer program stored on a tangible, computer-readable medium is provided which includes software commands for executing the method and its embodiments, when the computer program is executed in a data processing system.

BRIEF DESCRIPTION OF THE DRAWINGS

The aforementioned and other aspects of the subject innovation will be apparent from and elucidated with reference to the embodiments described hereinafter making reference to the accompanying drawings, in which.

DETAILED DESCRIPTION OF SPECIFIC EMBODIMENTS

Figure 1:
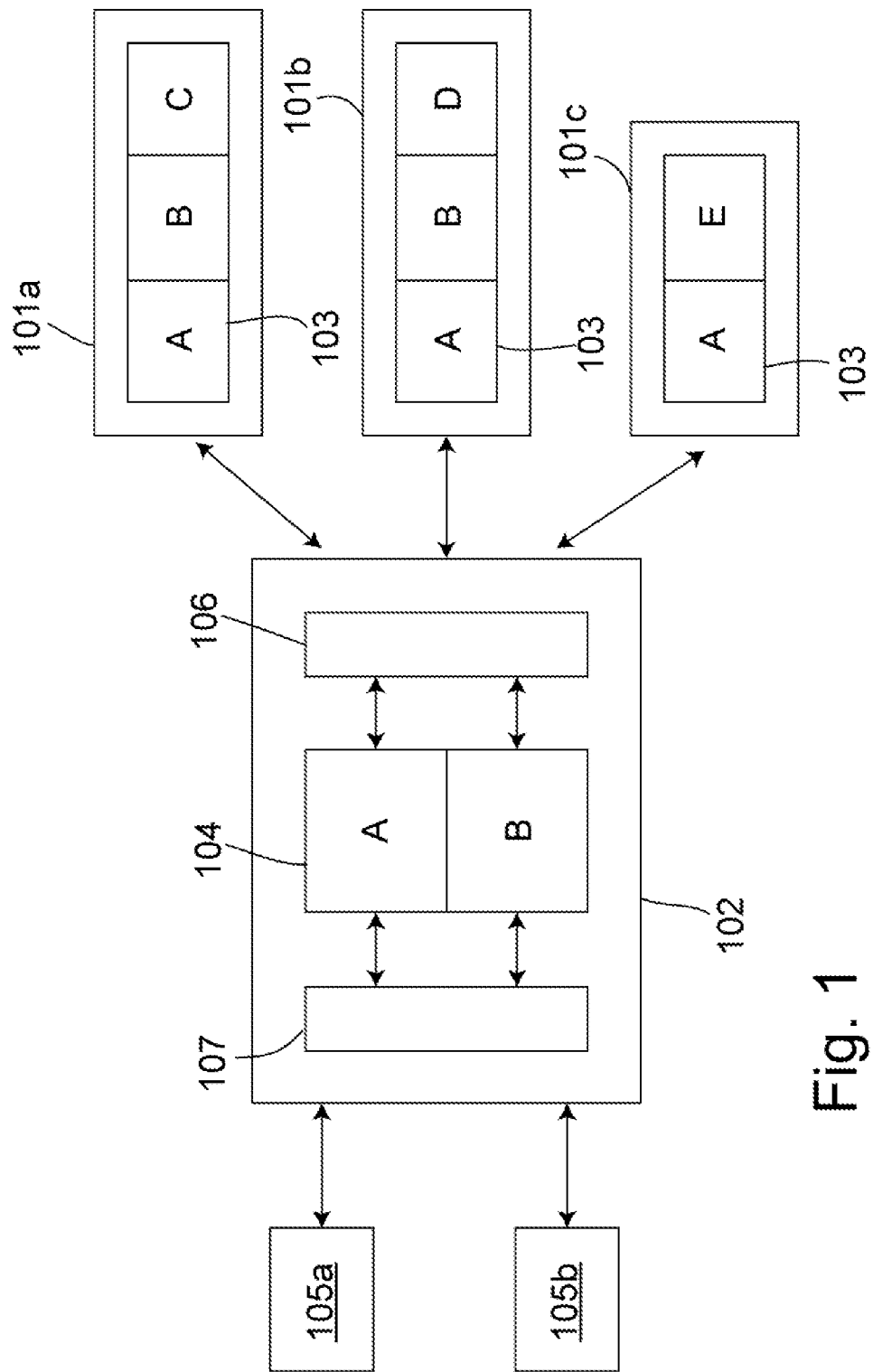
FIG. 1 is a block diagram showing an aggregation system which is connected to a plurality of social network services.

FIG. 1 schematically shows a plurality of social network service 101a,b,c, which are connected to an aggregation server 102. Each social network server 101a,b,c, provides a social network service to users which have subscribed to the service and are registered in the respective social network server 101a,b,c. By way of example, two social network servers 101a,b,c, are depicted in FIG. 1. However, also two or more than three social network servers 101a,b,c may be connected to the aggregation server 102.

Each user of a social network service disposes of a user account 103 in the social network server 101a,b,c providing the service the user has subscribed to. By way of example seven user accounts 103 for users A-E are shown in FIG. 1. Users A, B, C, have a user account 103 in the social network server 101a. In addition, the users A, B have a second user account 103 in the social network server 101b in which also the user D is registered. In the social network server 101c, there exist a third user account 103 of user A and a user account 103 for user E.

Each user account comprises a profile of the user including the user's personal details. When one user has user accounts 103 in multiple social network servers 101a,b,c, the profiles do not necessarily correspond to each other. In particular, the profiles may include different personal details of the user. The user accounts 103 may also include links to other users of the same social network service. Such links are usually called "friendship" relations and are generated by an interaction between the involved users via the social network service.

For interacting with other users of a social network service, the user accounts 103 may allow for exchanging messages with other users. For this purpose, message may be created in the user account 103 of the sender and may be sent to the user account 103 of the recipient, in which it is stored and through which the recipient can access the message. As an alternative, messages may be posted through the user account 103 and the messages are transmitted to other user accounts upon retrieval of the messages. The retrieved messages may be stored in the user account 103 essentially similar to message sent to the user account 103. The retrieval of the messages may be done automatically. For this purpose, a user may specify in his user account the other users from which posted messages are to be retrieved.

The messages may include text and/or multimedia content, such as, for example, audio and/or video data or so-called hyperlinks to certain destinations in a network. One example of a message transmitted to other users of a social network service is a so called status update, which may be posted or sent through a user account 103. In a status update, the user may express his current mood and feelings, his current location, actions he is currently performing, his availability to meet or chat with somebody or similar information, particularly information which is related to the current "status" of the user. Other users receiving the status update may reply thereto by sending a message to the user from which the status update originates.

Users of a social network service may access the corresponding social network server 101a,b,c, using client devices, which may be connected to the social network server 101a,b,c through a network such as, for example, the Internet. The social network server 101a,b,c, may provide a preferably web-based graphical user environment which allows for accessing and managing the user accounts 103. Likewise, the graphical user environment may allow for generating messages and for posting the messages or sending the messages to other users. Likewise, messages transmitted to the user account 103 are accessed using the graphical user environment.

The connection between the aggregation server 102 and the social network service 101a,b,c, may likewise be a network connection, which may be established via the Internet or another network. The aggregation server 102 includes further user accounts 104 via which the users can access their user account 103 in the social network servers 101a,b,c. By way of example, two user accounts 103 are depicted in FIG. 1, which belong to the users A and B, which dispose of multiple user accounts 103 in the social network servers 101a,b,c.

Using his user account 104 in the aggregation server 102, a user may manage his user account in the social network service 101a, b, c. For instance, there may be one user profile stored in the user account 104 in the aggregation server 102 which may be synchronized with the user profiles stored in the user accounts 103 in the social network servers 101a,b,c.

Moreover, in the user account 104 in the aggregation server 102, a user may generate messages which may be posted in or sent through one or more user accounts 103 of the user in the social network servers 101a,b,c. In order to allow the user to view generated messages the messages may also be stored in the user account 104 in the aggregation server 102 such that it can be accessed after the messages have been passed to the social network servers 101a,b,c. And, a user may access messages transmitted to his user accounts 103 in the social network servers 101a,b,c via the user account 104 in the aggregation server 102. For this purpose, the messages stored in the user accounts 103 in the social network servers 103 may be transmitted from the social network servers 101a,b,c to the aggregation server 102 and may be stored in the in the user account 104 of the user in the aggregation server 102.

When message generated in a user account of the aggregation server 102 is to be posted or sent through one or more user accounts in the social network servers 101a,b,c, a communication component 106 of the aggregation server passes the message to the relevant social network servers 101a,b,c. When passing the information to the social network servers, it also specifies the user or his user account 103 in the social network server 101a,b,c and instructs the social network servers 101a,b,c, to post the message in the user accounts 103 or sent the message through the user accounts 103 to one or more recipients. The recipients may be specified by the user when generating the message in the user account 104 in the aggregation server 102 and the recipients are passed to the social network servers 101a,b,c, when passing the message.

The communication component 106 also receives the messages transmitted from the user accounts 103 in the social network servers 101a,b,c, to the user accounts 104 in the aggregation server 102. It may be provided that the social network servers 101a,b,c send messages received in the user accounts 103 of the social network servers 101a,b,c to the communication component. This may be done regularly or upon receipt of the message. When the communication component 106 receives the messages it determines the user to which the messages are addressed and delivers the messages to the user account 104 of the user in the aggregation server 101a,b,c. As an alternative, the communication component 106 may retrieve the messages from the user accounts 103 of a user in the social network servers 101a,b,c in order to deliver them to the user account 104 of the user in the aggregation server 102. The retrieval may be done in regular time intervals or upon a command given by the user.

For interacting with the user, a presentation component 107 of the aggregation server 102 may provide a graphical user environment similar to the social network servers 101a,b,c.

Users may access the graphical user environment via a network, particularly the Internet, using client devices 105a, b. The client devices 105a, b, may be network-enabled user devices such as personal computers, notebook computers or mobile communication devices, such as mobile phones, personal data assistants (PDA's) and the like. By way of example, two client devices 105a, 105b are depicted which belong to the users A and B which have a user account 104 in the aggregation server 102.

Within the graphical user environment, the user may access his profile stored in his profile in the aggregation server. Furthermore, the graphical user environment is used to generated message and to control the transmission of the messages to the social network servers 101a,b,c and to view messages received in the user account 104 of the user in the aggregation server.

Figure 2:
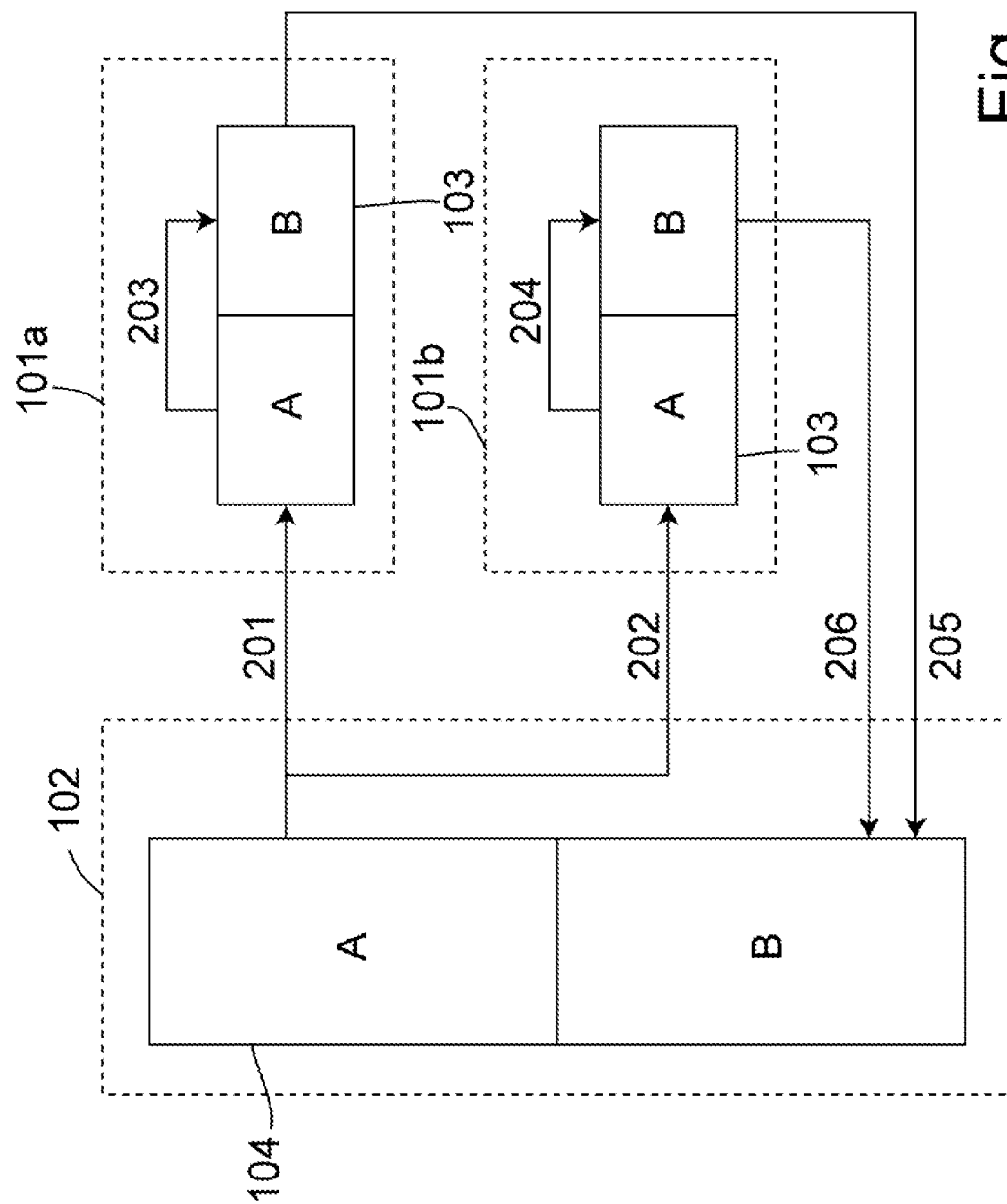
FIG. 2 is a block diagram showing steps of a method for processing multiple identical messages received from plural social network services.

In order to avoid that one message is presented multiple times in the graphical user environment, the aggregation server 102 uses mechanisms which will be described in the following:

FIG. 2 schematically shows a process in which user A provides a message to users of the social network servers 101a,b. User B receives the information through both social network servers 101a,b in his user account 104 in the aggregation server 102. Here, the aggregation server 102 ensures that the message is not presented to user B twice in the user account 104. The message may particularly be a status update. However, other messages may be presented in the same way to user B.

At first, user A generates the message in his user account 104 using his client device 105a. When the user has generated the message, the aggregation server 102 associates an identifier to the message. The identifier may be a unique identification code generated in the aggregation server 102. The identifier may be stored in the user account 104 of user A together with the message.

After the message has been generated, the communication component 106 of the aggregation server 102 (not shown in FIG. 2), passes the message together with the identifier to the social network servers 101a,b in which user A is registered. This is depicted as steps 201 and 202 in FIG. 2. In these steps, the communication component specifies the user accounts 103 of user A in the social network servers 101a,b, and instructs the social network servers 101a,b how to make the message available to other users of the social network service provided by the social network servers 101a,b,c, i.e. whether the message is to be sent to predetermined recipients or post in the user account 103 of user A. The recipients may be specified by user A when generating the message, and the communication component 106 may pass the recipients to the social network servers 101a,b,c when it passes the message to the social network servers 101a,b,c.

In steps 203 and 204, the message is transmitted from the user accounts of user A in the social network servers 101a,b to the user accounts of user B in the social network servers 101a,b. Depending on how the message is to be made available, the message may be sent from the accounts 103 of user A to the accounts 103 of user B, or the message may be transmitted upon retrieval. Together with the message the identifier is transmitted to the user accounts of user B. For this purpose, the social network servers 101a,b may include the identifier in metadata accompanying the message.

From the user accounts 103 of user B in the social network servers 101a,b, the message is transmitted together with the identifier to the user account 104 of user B in the aggregation server 102 in steps 205 and 206, because user B uses his user account 104 in the aggregation server 102 to view messages received in his user accounts 103 in the social network servers 102. Thus, the same message is received twice in the user account 104 of user B in the aggregation server and linked to the original message created and sent from the social network servers 102.

Before presenting messages to the user B in the graphical user environment, the presentation component 107 compares the identifiers of the messages received in the user account of user B. Then, it determines that multiple messages associated with the same identifier have been received. If the presentation component 107 determined that multiple messages associated with the same identifier have been received, as it is the case in the situation shown in FIG. 2, it presents only one of the messages to the user. The presented message may be selected according to a predetermined criterion.

Preferably, the message is presented which has been received at first. The presentation of the message may include the content of the message, an indication of the originator and an indication of the social network server 101a,b,c from which the message has been received.

If the presentation component 107 determines that multiple messages associated with the same identifier have been received, it may include in the presentation of the message selected for presentation an indication that a further copy of the same message has been received. The indication may specify the social network server 101a,b, from which the copy of the message, which is not presented, has been received. Thus, a user is informed that in addition to the presented copy of a message also another copy has been received from certain social network server 101a,b.

Figure 3:
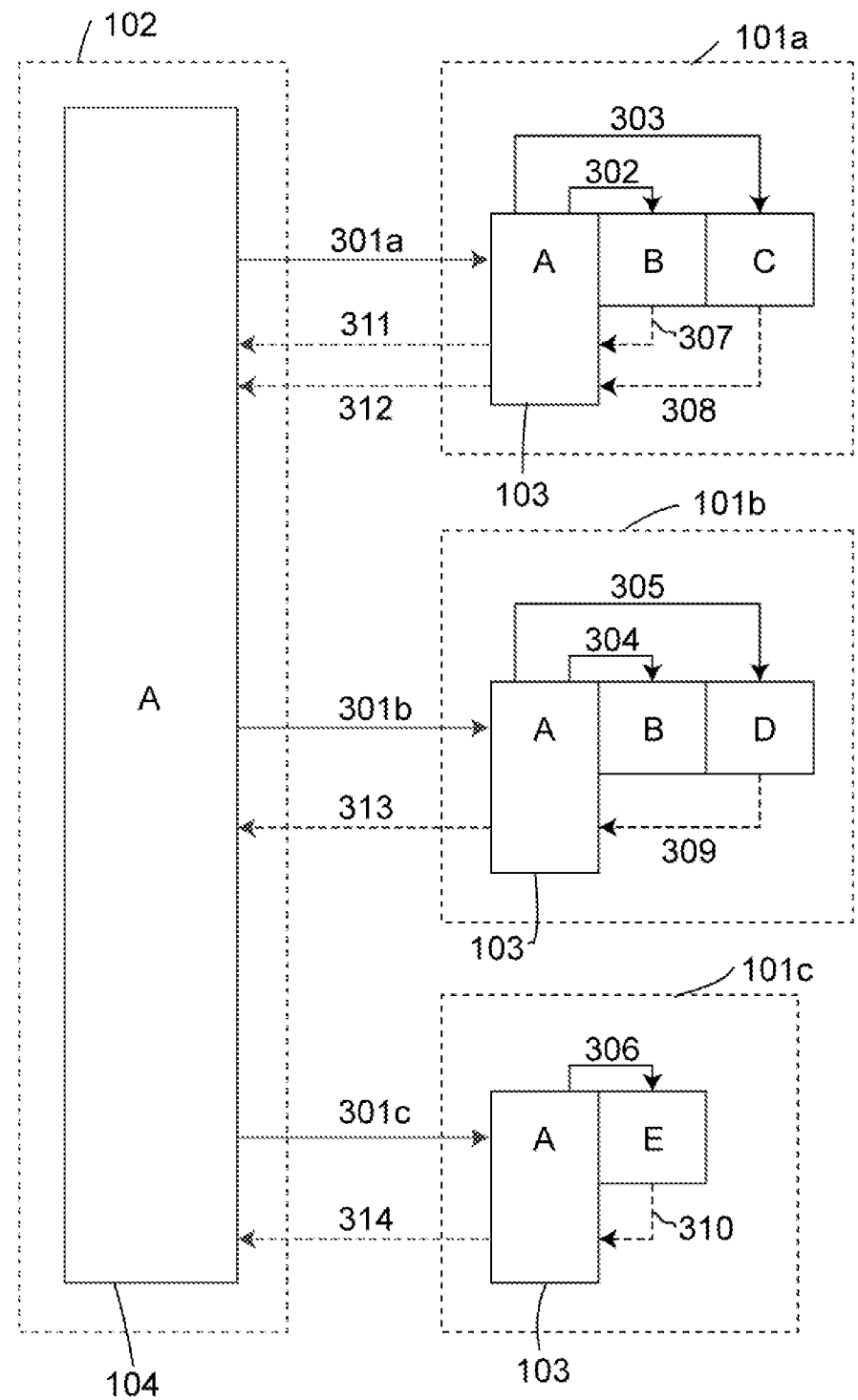
FIG. 3 is a block diagram showing the transmission of a message to various receivers and the transmission of reply messages.

FIG. 3 schematically depicts an embodiment, in which the identifier associated with a message generated by user A is used for grouping messages, which users of different social network services send as a reply to the message of user A. Again, the message may be a status message. However, messages received in reply to other messages may be treated in the same way.

The message is generated by user A in his user account 104 in the aggregation server 102. Again, the aggregation server associated an identifier with the message, which is stored together with the message in the user account 104 of user A.

In the steps 301a,b,c, the communication component 106 of the aggregation server 102 (not shown in FIG. 3) passes the message together with the identifier to the user accounts of user A in the social network servers 101a,b,c. As described before, the message is passed from the aggregation server 102 to the social network server 101a,b,c by the communication component 106 of the aggregation server 102, which also instructs the social network servers 101a,b,c how to make the message available to other users of the social network services, i.e. whether the message is to be sent to recipients specified by the user or to be posted in the user accounts 103 of user A.

From the user account of user A in the social network server 101a, the message is transmitted to the user accounts of the users B and C in the social network server 101a in the steps 302 and 303. From the user account of user A in the social network server 101b, the information is transmitted user accounts of the users B and D in the social network server 101b in the steps 304 and 305. And from the user account of user A in the social network server 101c, the message is transmitted to the user account of user E in the social network server 101a in step 306. A confirmation message is sent back to the aggregation server with the unique ID for that network 101a.

When transmitting the message from the user accounts of user A to the other user accounts, the social network servers 101a,b,c may include into the message the identifier, which has been provided by the aggregation server 102 when passing the message to the social network servers 101a,b,c.

In the situation depicted in FIG. 3 by way of example, each user B-E generates a reply message as a response to the message provided by user A. User B, who disposes of user accounts in the social network servers 102a,b, generates his reply message via the social network server 101a. However, user B could also send a reply message to user A via the social network server 101b or via both social network servers 101a, b. Furthermore, a reply message may not be generated by each user receiving a message in other situations.

Each reply message is transmitted from the user account of the sender of the reply message to the user account of the receiver of the reply message, i.e. the user account of user A, in the same social network server 101a,b,c. Thus, the reply messages of the users B and C are sent to the user account of user A in the social network server 101a in steps 307 and 308, the reply message of user D is sent to the user account of user A in the social network server 101b in step 309 and the reply message of user E is sent to the user account of user A in the social network server 101c.

The social network servers 101a,b,c are programmed in such a way that the identifier, which is associated in the messages received in the user accounts 103 of the users B-E is also associated with the reply message generated by the user B-E. In particular, the identifier may be included automatically in the metadata of the reply message, when the reply messages are generated.

From the user accounts of user A in the social network servers 101a,b,c, the reply messages are transmitted to the user account 104 of user A in the aggregation server 102, since user A uses the aggregation server 102 to view message received in his user accounts 103 in the social network servers 101a,b,c. The reply messages are transmitted to the user account 104 of user A in the aggregation server 102 via the communication component 106 in the way described before. The transmission of the replay messages of users B and C from social network server 101a is effected in steps 311 and 312, the transmission of the reply message of user D from social network server 101b is effected in step 313 and the transmission of the reply message of user E from social network server 101c is effected in step 314.

Before the presentation component 107 of the aggregation server 102 (not shown in FIG. 3) presents the received reply messages in the graphical user environment used by user A for accessing his user account 104, it evaluates the identifiers included in the messages and compares the identifiers associated with the messages generated by user A stored in the user account of user A in the aggregation server 102. For the reply messages of the users B-E, the presentation component 107 determines a match with the identifier associated with the message transmitted to the social network servers 101a,b,c in the steps 301a,b,c. Due to this match, the presentation component presents the reply messages to user A in connection with the message in the graphical user environment for accessing the user account 104 of user A. The presentation is particularly made in such a way that user A sees that the reply messages have been sent in reply to the originating message stored in the user account 104 of user A.

In one embodiment, the presentation component 107 may present in the graphical user environment a list including the message at the beginning the reply messages in the following list entries. The list may include the content of the messages, or it may only include a header and the content of a reply message may be accessed by selecting the corresponding header in the list. In the presentation, the sender of the reply message may be specified and the social network service or server 101*a,b,c* via which the reply message has been sent.

The presentation component 107 may order the reply messages according to one or more predetermined criteria. The reply messages may be ordered according to the time of receipt. Furthermore, the reply messages may be grouped according to social network server 101*a,b,c* from which they have been received. This allows the user, to quickly follow through the different conversation threads that will exist per social network. Within one group, which includes the reply messages received from one social network server 101*a,b,c*, the reply messages may be ordered according to the time of receipt, for example. Preferably, the user may be able to switch between different order criteria.

In the embodiments described before, the identifier assigned to an identification item is passed to the social network servers 101*a,b,c* and the social network servers 101*a,b,c* transmit the message from the user account of user A to the user accounts of other users together with the identifier generated in the aggregation server 102. The reply messages also include the identifier.

In further embodiments, one or more social network servers 101*a,b,c* may use a different identifier, when transmitting a message (or a reply message) from one user account to another user account. In these embodiments, a mapping unit is provided in the communication component 106 of aggregation server 102 or in the relevant social network servers 101*a,b,c*. When a message is passed from the aggregation server 102 to a social network server 101*a,b,c*, the mapping unit may replace the identifier assigned to the message by the aggregation server 102 by the identifier used in the social network server 101*a,b,c*. In addition, the mapping unit may store an allocation between both identifiers in a mapping table. A reply message to the message may be provided with the identifier used in the social network server 101*a,b,c*. When the message or a reply message thereto is passed from the social network server 101*a,b,c* to the aggregation server 102, the mapping unit replaces this identifier with the allocated identifier stored in the mapping table or it adds the allocated identifier stored in the mapping table. Thus, the social network servers 101*a,b,c* and the aggregation server may use their own identifiers.

The computer program can also be used for data mining to build up intelligence from the communication between the contacts.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. A computer program may be stored and/or distributed on a suitable medium, such as an optical storage medium or a solid-state medium supplied together with or as part of other hardware, but may also be distributed in other forms, such as via the Internet or other wired or wireless telecommunication systems.

What is claimed is:

1. A method for presenting messages to a user of social network services, the messages being provided via an aggregation system, the aggregation system being connected to the social network services, the method comprising:
    storing an identifier associated with a message in a user account of the user in the aggregation system;
    receiving messages from the social network services in the aggregation system, the messages being associated with the identifier;
    presenting the received messages to the user in response to a comparison between an identifier associated to the received messages and the identifier stored in the user account;
    storing an identifier associated with a first message in response to a receipt of the first message in the aggregation system;
    presenting the first message to the user;
    suppressing presentation of content of a second received message if the second received message is associated to the stored identifier associated with the first message such that multiple presentation of messages associated to the stored identifier received from different social network services can be avoided;
    associating an originating message with an identifier in the aggregation system and the aggregation system providing the originating message to the social network services; and
    storing the identifier in the aggregation system in connection with passing the originating message from the aggregation system to the social network services.

2. The method recited in claim 1, comprising notifying the user of receipt of the second message, the notification particularly specifying the social network service from which the second message was received.

3. The method recited in claim 1, comprising associating a reply transmitted from a social network service to the aggregation system as a response to the originating message to the identifier of the originating message.

4. The method recited in claim 1, comprising presenting the reply to the user in association to the originating message, when it is determined in the aggregation system that the identifier associated to the reply corresponds to the identifier associated to the originating message stored in the aggregation system.

5. The method recited in claim 4, comprising presenting a plurality of replies associated with an identifier corresponding to the identifier associated to the originating message to the originating message to the user as a group of messages.

6. The method recited in claim 4, comprising specifying in the presentation of the reply the social network service, from which the reply is received in the aggregation system.

7. The method recited in claim 1, comprising replacing the identifier associated to a message by the aggregation system by another identifier, when passing the message to a social network service, an allocation between the identifiers being stored in a mapping table, and the method further comprising replacing the other identifier by the original identifier using the mapping table, when the message or a reply thereto is received from the social network service in association with the other identifier.

8. An aggregation system comprising an aggregation server for providing messages to a user of social network services, the aggregation system being connected to the social network services and comprising:
    a user account of the user which is adapted to store an identifier associated with at least one message, wherein the user account is adapted to store the identifier associated with a first message in response to a receipt of the first message in the aggregation system;

a receiving component adapted to receive messages from the social network services in the aggregation system, the messages being associated with an identifier; and a presentation component adapted to present the received messages to the user in response to a comparison between the identifier associated to the received messages and the identifiers stored in the user account, wherein the presentation component is adapted to present the first message to the user, and wherein the presentation unit is further adapted to suppress presentation of content of a second received message if the second received message is associated with the stored identifier associated with the first message such that multiple presentation of messages associated to the stored identifier received from different social network services can be avoided; and wherein the aggregation system being further adapted to associate an originating message with an identifier in the aggregation system, and the aggregation system being adapted to provide the originating message to the social network services, and the aggregation system being adapted to store the identifier in the aggregation system in connection with passing the originating message from the aggregation system to the social network services.

9. The aggregation system recited in claim 8, wherein the presentation component provides the messages for presentation at a client device of the user, the client device particularly being a mobile communication device.

* * * * *